US012617528B2

(12) United States Patent
Tang et al.

(10) Patent No.: US 12,617,528 B2
(45) Date of Patent: May 5, 2026

(54) APPARATUS CONNECTION METHOD AND DEVICE, HARDWARE APPARATUS, AND COMPUTER-READABLE STORAGE MEDIUM

(71) Applicant: SZ DJI TECHNOLOGY CO., LTD., Shenzhen (CN)

(72) Inventors: Ziqing Tang, Shenzhen (CN); Zhilong Chen, Shenzhen (CN); Jia Li, Shenzhen (CN); Shengyang Yu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 291 days.

(21) Appl. No.: 18/310,659

(22) Filed: May 2, 2023

(65) Prior Publication Data

US 2023/0264815 A1 Aug. 24, 2023

Related U.S. Application Data

(63) Continuation of application No. PCT/CN2020/126729, filed on Nov. 5, 2020.

(51) Int. Cl.
*H04W 76/14* (2018.01)
*B64C 39/02* (2023.01)
(Continued)

(52) U.S. Cl.
CPC ............. *B64C 39/024* (2013.01); *H04W 4/80* (2018.02); *H04W 12/009* (2019.01);
(Continued)

(58) Field of Classification Search
CPC ...... B64C 39/024; H04W 76/14; H04W 4/80; H04W 12/009; B64U 2201/20; B64U 2101/30
See application file for complete search history.

(56) References Cited

U.S. PATENT DOCUMENTS 10,621,443 B2 * 4/2020 Seeber ..................... G08G 5/59
11,603,200 B2 * 3/2023 Bruhn ................... H04W 28/02
(Continued)

FOREIGN PATENT DOCUMENTS

CN 102655660 A 9/2012
CN 104135728 A 11/2014
(Continued)

OTHER PUBLICATIONS

The World Intellectual Property Organization (WIPO) International Search Report for PCT/CN2020/126729 Jul. 26, 2021 6 pages (including translation).

*Primary Examiner* — Peter D Nolan
*Assistant Examiner* — Matthew Cobb
(74) *Attorney, Agent, or Firm* — ANOVA LAW GROUP, PLLC

(57) ABSTRACT

An apparatus connection method includes, in response to a mobile apparatus entering a preset mode, detecting one or more connectable apparatuses near the mobile apparatus that are capable of connecting to the mobile apparatus in a first connection mode, determining the UAV from the one or more connectable apparatuses according to a signal parameter of a broadcast signal sent by each of the one or more connectable apparatuses, and communicatively connecting to the UAV according to the first connection mode. The first connection mode is different from a second connection mode for controlling the UAV to perform an aerial photography task and receiving a compressed image sent by the UAV while performing the aerial photography task. A download speed of the first connection mode is greater than a download speed of the second connection mode.

11 Claims, 7 Drawing Sheets

(51) Int. Cl.

| | | |
|---|---|---|
| *H04W 4/80* | (2018.01) | |
| *H04W 12/00* | (2021.01) | |
| *B64U 101/30* | (2023.01) | |

(52) U.S. Cl.
CPC ......... *H04W 76/14* (2018.02); *B64U 2101/30* (2023.01); *B64U 2201/20* (2023.01)

(56) References Cited

U.S. PATENT DOCUMENTS

| | | | |
|---|---|---|---|
| 2013/0279621 A1* | 10/2013 | Yonge, III ............ | H04L 1/0001 375/285 |
| 2017/0270314 A1* | 9/2017 | Tsybrovskyy ........ | H04W 12/06 |
| 2020/0102074 A1 | 4/2020 | Kinsley et al. | |
| 2020/0372811 A1* | 11/2020 | Lindqvist ............. | G05D 1/0022 |
| 2021/0287559 A1* | 9/2021 | Jeong .................... | G06V 10/25 |

FOREIGN PATENT DOCUMENTS

| | | | | |
|---|---|---|---|---|
| CN | 106028421 A | 10/2016 | | |
| CN | 106331812 A | 1/2017 | | |
| CN | 106375815 A | 2/2017 | | |
| CN | 106604205 A | 4/2017 | | |
| CN | 106912085 A | 6/2017 | | |
| CN | 106954281 A | 7/2017 | | |
| CN | 107635214 A | 1/2018 | | |
| CN | 107911532 A | 4/2018 | | |
| CN | 111386714 A | 7/2020 | | |
| CN | 114208134 B | * | 7/2024 | ............ H04W 12/08 |

\* cited by examiner

When the third-party apparatus is communicatively connected to the hardware apparatus in a first connection mode for the first time, connect the third-party apparatus to the hardware apparatus according to pre-stored effective information of the hardware apparatus, obtain the effective information by obtaining the effective information of the hardware apparatus in a second connection mode when the third-party apparatus is communicatively connected to the hardware apparatus in the second connection mode, the effective information being associated with the first connection mode

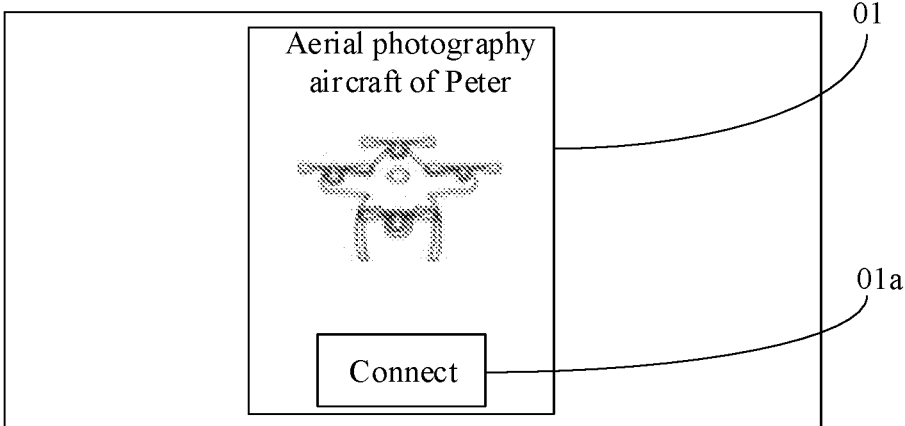

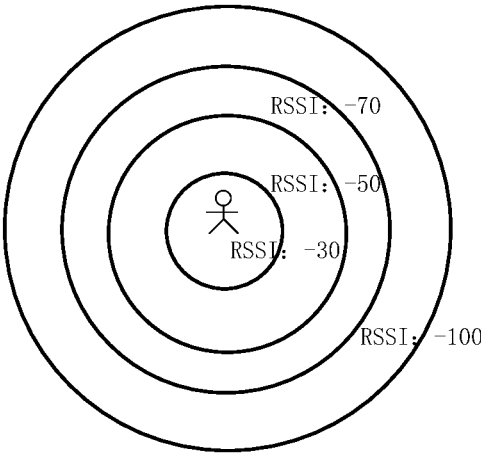

FIG. 5

When the hardware apparatus is communicatively connected to the third-party apparatus in the first connection mode for the first time, connect the hardware apparatus to the third-party apparatus according to pre-saved authentication information of the third-party apparatus, when the hardware apparatus is communicatively connected to the third-party apparatus in the second connection mode, the authentication information of the third-party apparatus being obtained in the second connection mode.     ～ 201

FIG. 6

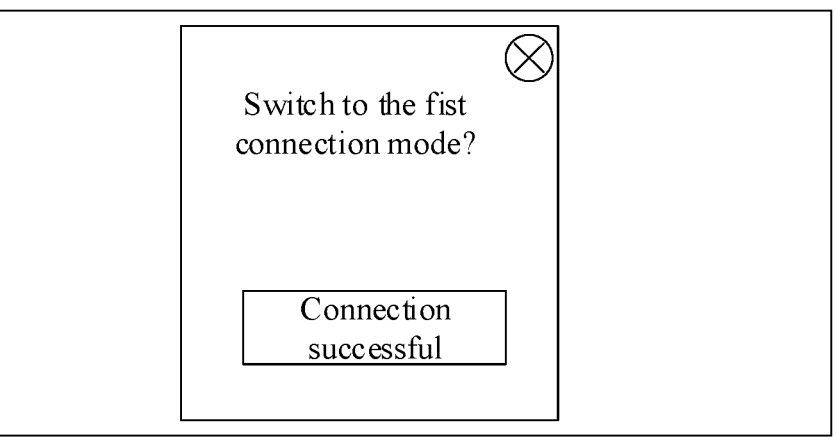
FIG. 11
Apparatus connection device
Memory 401
Processor 402
FIG. 12
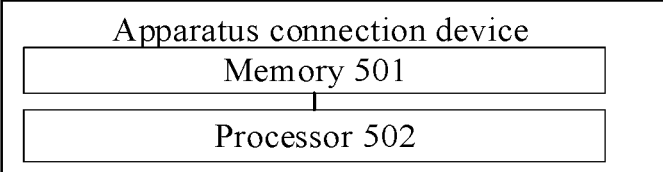
FIG. 13

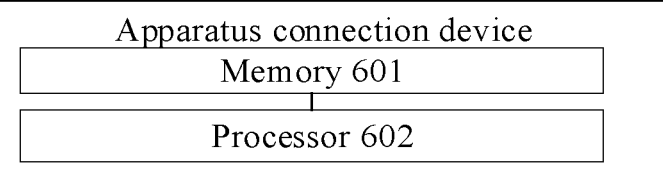
FIG. 14
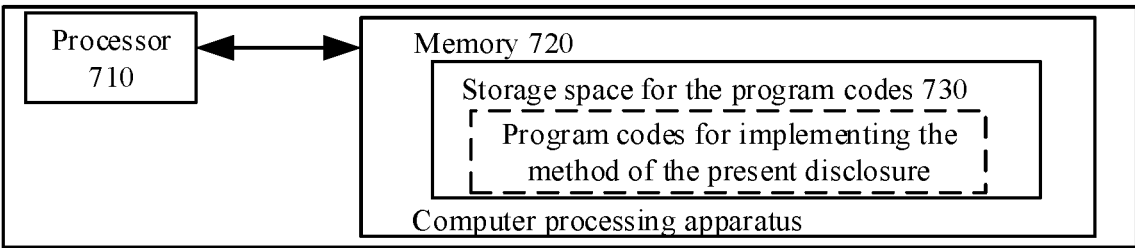
FIG. 15
Storage unit for the program codes
Readable codes for implementing the method of
the present disclosure
FIG. 16

APPARATUS CONNECTION METHOD AND DEVICE, HARDWARE APPARATUS, AND COMPUTER-READABLE STORAGE MEDIUM

CROSS-REFERENCE TO RELATED APPLICATION

This application is a continuation of International Application No. PCT/CN2020/126729, filed Nov. 5, 2020, the entire content of which is incorporated herein by reference.

TECHNICAL FIELD

The present disclosure relates to the network technology field and, more particularly, to an apparatus connection method, a device, a hardware apparatus, and a computer-readable storage medium.

BACKGROUND

Currently, hardware apparatuses are widely used. To facilitate a user to control a hardware apparatus, the hardware apparatus often provides a plurality of connection modes for the user to use. With the plurality of connection modes, how to conveniently and efficiently connect to the hardware apparatus based on the plurality of connection modes has become a problem. In the existing technology, a connection is often established through a manual selection. However, such a connection is not efficient.

SUMMARY

In accordance with the disclosure, there is provided an apparatus connection method. The method includes, in response to a mobile apparatus entering a preset mode, detecting one or more connectable apparatuses near the mobile apparatus that are capable of connecting to the mobile apparatus in a first connection mode, determining an unmanned aerial vehicle (UAV) from the one or more connectable apparatuses according to a signal parameter of a broadcast signal sent by each of the one or more connectable apparatuses, and communicatively connecting to the UAV according to the first connection mode. The first connection mode is different from a second connection mode for controlling the UAV to perform an aerial photography task and receiving a compressed image sent by the UAV while performing the aerial photography task. A download speed of the first connection mode is greater than a download speed of the second connection mode.

Also in accordance with the disclosure, there is provided an apparatus connection method. The method includes, after receiving a connection request sent by a mobile apparatus of performing a communicative connection in a first connection mode, connecting to the mobile apparatus according to pre-stored authentication information of the mobile apparatus. The authentication information of the mobile apparatus is obtained in a second connection mode when an unmanned aerial vehicle (UAV) is communicatively connected to the mobile apparatus in the second connection mode.

Also in accordance with the disclosure, there is provided an apparatus connection method. The method includes, controlling a mobile apparatus to be connected to an unmanned aerial vehicle (UAV) in a second connection mode; receiving and displaying in real-time a compressed image sent by the UAV during an aerial photography task, and in response to receiving a switch instruction, controlling the mobile apparatus to switch from the second connection mode to a first connection mode and controlling the mobile apparatus to enter a high-speed download mode based on the first connection mode. A download speed of the first connection mode is greater than a download speed of the second connection mode.

BRIEF DESCRIPTION OF THE DRAWINGS

FIG. 1 is a flowchart of an apparatus connection method consistent with an embodiment of the present disclosure.

FIG. 2 is a schematic diagram showing information prompting consistent with an embodiment of the present disclosure.

FIG. 5 is a schematic diagram showing detection consistent with an embodiment of the present disclosure.

FIG. 6 is a schematic flowchart of another apparatus connection method consistent with an embodiment of the present disclosure.

FIG. 11 is a schematic diagram of another interface consistent with another embodiment of the present disclosure.

FIG. 12 is a schematic block diagram of an apparatus connection device consistent with another embodiment of the present disclosure.

FIG. 13 is a schematic block diagram of another apparatus connection device consistent with another embodiment of the present disclosure.

FIG. 14 is a schematic block diagram of another apparatus connection device consistent with another embodiment of the present disclosure.

FIG. 15 is a schematic block diagram of a computation processing apparatus consistent with another embodiment of the present disclosure.

FIG. 16 is a schematic block diagram of a portable or fixed storage unit consistent with another embodiment of the present disclosure.

DETAILED DESCRIPTION OF THE EMBODIMENTS

Figure 3:
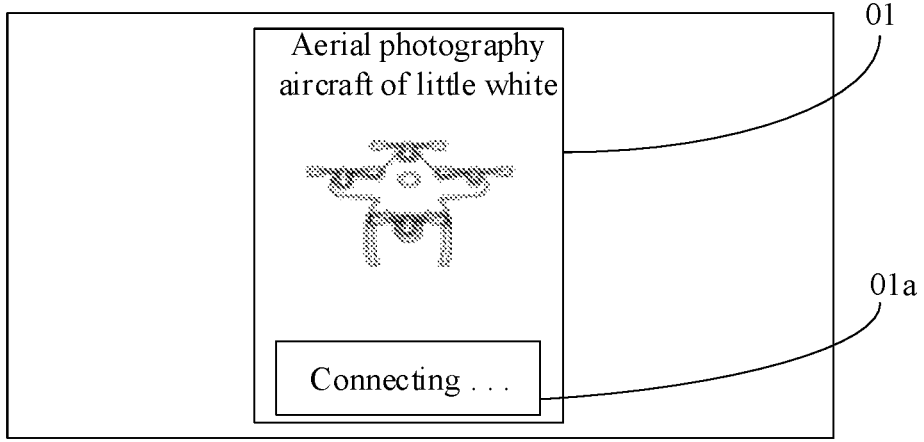
FIG. 3 is another schematic diagram showing information prompting consistent with an embodiment of the present disclosure.

The technical solutions of embodiments of the present disclosure are described in detail below with reference to the accompanying drawings of embodiments of the present disclosure. All other embodiments obtained by those of ordinary skill in the art based on embodiments of the present disclosure without creative efforts are within the scope of the present disclosure.

First, an application scenario associated with embodiments of the present disclosure is described. In a scenario when a third-party apparatus establishes a connection with a hardware apparatus for the first time, the third-party apparatus may need to establish a communicative connection with the hardware apparatus based on effective information related to a connection mode. For example, when the third-party apparatus establishes a communicative connection with the hardware apparatus in the first connection mode for the first time, the third-party apparatus may need to establish the communicative connection with the hardware apparatus in the first connection mode based on the effective information of the hardware apparatus related to the first connection mode. Since obtaining effective information from the outside through the third-party apparatus is often complex, connection efficiency can be low. Thus, embodiments of the present disclosure provide an apparatus connection method to improve the connection efficiency.

The apparatus connection method is described below in detail.

FIG. 1 is a flowchart of an apparatus connection method consistent with an embodiment of the present disclosure. The method can be applied to a third-party apparatus. As shown in FIG. 1, the method includes the following processes.

At 101, when the third-party apparatus is communicatively connected to the hardware apparatus in a first connection mode for the first time, the third-party apparatus is connected to the hardware apparatus according to pre-stored effective information of the hardware apparatus. The effective information can be obtained by obtaining the effective information of the hardware apparatus in a second connection mode when the third-party apparatus is communicatively connected to the hardware apparatus in the second connection mode. The effective information is associated with the first connection mode.

In embodiments of the present disclosure, the hardware apparatus can include an intelligent hardware apparatus, such as an unmanned aerial vehicle (UAV), an unmanned vehicle, a handheld gimbal, etc. The third-party apparatus can refer to an apparatus that is made by a manufacturer different from the manufacturer of the hardware apparatus. The third-party apparatus can include a mobile device such as a mobile phone or a tablet computer. An application (APP) corresponding to the hardware apparatus can be installed on the third-party apparatus. For example, interaction with the hardware apparatus can be performed based on the APP installed on the third-party apparatus. The first connection mode and the second connection mode can be connection modes provided by the hardware apparatus. Specific types of the first connection mode and the second connection mode can be determined by the specific type of hardware apparatus. Connection modes of different hardware apparatuses can be different.

Further, when the third-party apparatus is communicatively connected to the hardware apparatus in the second connection mode, since the communicative connection has been performed between the third-party apparatus and the hardware apparatus, the effective information can be directly and conveniently obtained and pre-stored in the third-party apparatus through the communicative connection established in the second connection mode for subsequent use. The specific type of effective information can be determined by the specific type of the first connection mode. The effective information corresponding to different first connection modes can be different. Correspondingly, when the third-party apparatus and the hardware apparatus are communicatively connected in the first connection mode for the first time, the pre-stored effective information can be directly read in the third-party apparatus. Thus, the communicative connection can be established in the first connection mode based on the effective information. When the third-party apparatus is not communicatively connected to the hardware apparatus in the first connection mode for the first time, the third-party apparatus can also be directly connected to the hardware apparatus based on the pre-stored effective information, which is not limited in embodiments of the present disclosure.

In summary, in the device connection method of embodiments of the present disclosure, when the third-party apparatus is communicatively connected to the hardware apparatus in the second connection mode, the effective information associated with the first connection mode can be obtained in the second connection mode. For example, the third-party apparatus can be communicatively connected to the hardware apparatus in the first connection mode for the first time, and the effective information associated with the first connection mode is pre-obtained and pre-stored. When the third-party apparatus is communicatively connected to the hardware apparatus in the first connection mode, the third-party apparatus can be connected to the hardware apparatus directly based on the pre-stored effective information in the third-party apparatus. Thus, the connection efficiency can be improved.

In embodiments of the present disclosure, the third-party apparatus can enter the first connection mode in the following manner. When the communicative connection in the second connection mode is converted from a first preset state to a second preset state, the second connection mode can be switched to the first connection mode. In some other embodiments, when a switch instruction of the user is received, the s econd connection mode can be switched to the first connection mode. In some other embodiments, when a connection instruction of directly entering the first connection mode is received, the communicative connection can be performed in the first connection mode.

In embodiments of the present disclosure, the third-party apparatus entering the first connection mode can refer to the third-party apparatus entering a mode in which the third-party apparatus performs the communicative connection in the first connection mode. After entering the first connection mode, the third-party apparatus can establish the communicative connection with the hardware apparatus according to the first connection mode. In some embodiments, the first connection mode can be a mode in which the third-party apparatus can be directly connected to the hardware apparatus. Further, the first connection mode of embodiments of the present disclosure can include one or more of a Bluetooth connection, a wireless fidelity (Wi-Fi) network connection, or a Bluetooth Wi-Fi combined link. Since the Bluetooth connection and the Wi-Fi network connection are often fast, the Bluetooth connection and the Wi-Fi network connection can be used as the first connection mode, which can ensure transmission efficiency between the third-party apparatus and the hardware apparatus. In the second connection mode, the third-party apparatus can be connected to the hardware apparatus through a remote control device. Connecting the remote control device to the hardware apparatus can be used as the second connection mode to conveniently and quickly control the hardware apparatus to perform various tasks. The remote control device can include a remote controller paired with the hardware apparatus. The remote control device can be connected to the hardware apparatus through a software-defined radio (SDR). The hardware apparatus can be controlled by the remote control device. The first preset state can include that the remote control device is normally connected to the hardware apparatus, and the remote control device is normally connected to the third-party apparatus. The second preset state can include that the remote control device is disconnected from the hardware apparatus, and the connection between the remote control device and the hardware apparatus is unstable or abnormal. The second preset state can further include that the remote control device is disconnected from the third-party apparatus, and the connection between the third-party apparatus and the remote control device is unstable or abnormal.

In the following, for example, the hardware apparatus can include the UAV, the third apparatus can include the mobile phone, and the remote control device can be a remote controller. The first preset state and the second preset state can be described. In the second connection mode, the UAV and the remote control device can perform a communicative connection remotely. The remote control controller can be connected to the mobile phone through a wired. The first preset state can include that the remote controller is normally connected to the UAV, and the remote controller is normally connected to the mobile phone. The second preset state can include that the remote controller is disconnected from the UAV, and the connection between the remote controller and the UAV is unstable or abnormal. The second preset state can further include that the remote controller is disconnected from the mobile phone, and the connection between the remote controller and the mobile phone is unstable or abnormal.

In an actual application scenario, if the remote controller is normally connected to the hardware apparatus, the user can be indicated to be in a state in which the user needs to use the remote controller to control the hardware apparatus. Further, if the communicative connection of the second connection mode is converted from the first preset state to the second preset state, the remote controller is disconnected from the hardware apparatus, and the connection between the remote controller and the hardware apparatus is unstable and abnormal. Thus, the third-party can need to establish the connection in another mode to determine that the third-party apparatus enters the first connection mode. Correspondingly, when the communicative connection in the second connection mode is converted from the first preset state to the second preset state, the user can be high possibly considered to establish the connection in the first connection mode in the current application scenario. Thus, the second connection mode can be switched to the first connection mode. In some embodiments, the first connection mode can correspond to a high-speed download mode based on WIFI. Assume that the remote controller is connected to the third-party apparatus (e.g., mobile phone), and the remote controller is connected to the UAV through SDR mode, the remote controller is connected to the third-party apparatus through a wire, the user can control the UAV to perform an aerial photography task through the remote controller, the remote controller can receive a compressed image sent by the UAV, and the compressed image can be forwarded to the third-party apparatus to perform display in real-time. When the SDR connection between the remote controller and the UAV is disconnected, the third-party apparatus can enter the high download mode based on the WIFI connection automatically. Thus, the third-party apparatus can directly enter the first connection mode to cause the third-party apparatus to be connected to the UAV through the WIFI network to facilitate the transmission of an original image without compression to the third-party apparatus.

Further, the switch instruction can be sent when the user needs to switch the second connection mode to the first connection mode. The switch instruction can be sent through a switch option provided by the third-party apparatus. For example, the third-party apparatus can display a switching button, and the user can click the switch button when the user needs to switch the second connection mode to the first connection mode to input the switch instruction to the third-party apparatus. Correspondingly, after the third-party apparatus receives the switch instruction, it can be determined that the user currently needs to use the first connection mode to establish the connection with the hardware apparatus. Therefore, the second connection mode can be switched to the first connection mode.

Further, the connection instruction of directly entering the first connection mode can be sent when the user needs to directly enter the first connection mode. The connection instruction can be sent through the connection option provided by the third-party apparatus. For example, the third-party apparatus can display a connection button, and the user can click the connection button when the third-party apparatus needs to directly enter the first connection mode to input the connection instruction to the third-party apparatus. Correspondingly, after receiving the connection instruction, the third-party apparatus can directly enter the first connection mode. That is, the communicative connection can be performed in the first connection mode.

In embodiments of the present disclosure, the third-party apparatus can actively enter the first connection mode when the communicative connection in the second connection mode is converted from the first preset state to the second preset state. Thus, the third-party apparatus can enter the first connection mode conveniently without waiting for a user operation. Thus, the efficiency of entering the first connection mode can be improved. By entering the first connection mode when receiving the switch instruction or connection instruction sent by the user, the control flexibility of the user can be improved to avoid an unnecessary operation of entering the first connection mode. Thus, operation resources can be saved to a certain degree, and user experience can be improved. For example, after the aerial photography is completed, a normal user needs to download high-definition material to the third-party apparatus (e.g., personal mobile phone and personal computer of the user). The downloading speed can be low through the existing manner of forwarding through the remote controller. Moreover, the connection between the third-party apparatus and the remote controller is tedious. Thus, through the direct switch manner, the user operation can be reduced, and the user experience can be improved.

In embodiments of the present disclosure, before the third-party apparatus is connected to the hardware apparatus according to the pre-stored effective information of the hardware apparatus, the following processes can be performed.

At process A, first connection prompt information is displayed. The first connection prompt information is used to indicate whether to connect the hardware apparatus in the first connection mode.

In this process, the first connection prompt information can include apparatus information of the hardware apparatus to facilitate the user to determine whether to connect the hardware apparatus in the first connection mode based on the first connection prompt information. For example, the apparatus information can include an apparatus name. FIG. 2 is a schematic diagram showing information prompting consistent with an embodiment of the present disclosure. As shown in FIG. 2, the first connection prompt information 01 includes the apparatus name "aerial photography aircraft of Peter" and connection option 01a. At process B, if a first operation with respect to the first connection prompt information is received, an operation of connecting the hardware apparatus according to the effective information of the pre-stored hardware apparatus is performed.

In this process, the first operation can be an operation indicating and determining to connect the hardware apparatus in the first connection mode. The specific operation mode of the first operation can be set according to actual requirements. For example, the first operation can include an operation such as clicking, sliding, long pressing, etc. For example, the first operation can include a click operation on the connection option in the first connection prompt information. If the first operation is received, it is determined that the user needs to connect the hardware apparatus in the first connection mode. Thus, the connection operation can be correspondingly performed.

Figure 4:
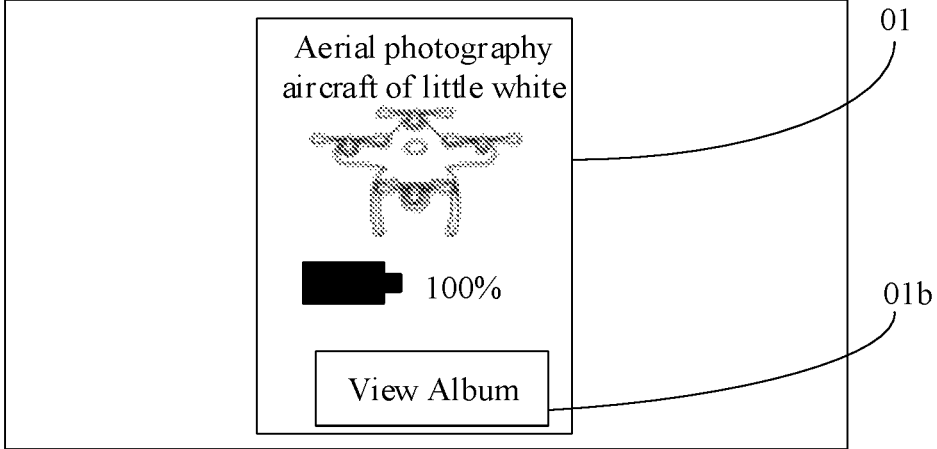
FIG. 4 is a schematic diagram of an interface consistent with an embodiment of the present disclosure.

After the user performs the click operation on the connection option, the third-party apparatus can further display information about the current connection state for the user. For example, FIG. 3 is another schematic diagram showing information prompting consistent with an embodiment of the present disclosure. As shown in FIG. 3, in a connection process, "connecting" can be displayed in connection option 01*a*. Further, after the connection is successful, the related information of the hardware apparatus can also be displayed, for example, electric power information. For example, FIG. 4 is a schematic diagram of an interface consistent with an embodiment of the present disclosure. As shown in FIG. 4, electric power "100%" and an album viewing option 01*b* for viewing the hardware apparatus can be displayed in the interface.

At process C, if a second operation with respect to the first connection prompt information is received, a temporary block operation is performed on the hardware apparatus.

In this process, the second operation can be an operation representing the rejection of the connection to the hardware apparatus in the first connection mode. The specific operation mode of the second operation can be set according to actual requirements. For example, the second operation can be a sliding operation on the first connection prompt information. In some other embodiments, a cancel option can also be displayed. The second operation can be a click operation on the cancel option. Correspondingly, if the second operation is received, it can be considered that the user does not need to be connected to the hardware apparatus currently. For example, when the user performs other operations by using the third-party apparatus, for example, when using the third-party apparatus to chat, the third-party apparatus may not need to be connected to the hardware apparatus at the moment, and the user may not want to be disturbed by the connection prompt information. Thus, the temporary block operation can be performed on the hardware apparatus.

In embodiments of the present disclosure, the first connection prompt information can be displayed first before the third-party apparatus is connected to the hardware apparatus. When the user performs the first operation on the first connection prompt information, that is, the user ensures to establish the connection with the hardware apparatus, the operation of connecting the hardware apparatus according to the pre-stored effective information of the hardware apparatus can be then performed. Thus, the possibility of connecting to a wrong apparatus can be reduced to improve the connection effect. Meanwhile, by performing the second operation on the first connection prompt information when the user does not need to connect the hardware apparatus, the temporary block operation can be performed on the hardware apparatus. Thus, the operation efficiency of temporarily blocking the hardware apparatus can be improved to a certain degree.

In embodiments of the present disclosure, performing the temporary block operation on the hardware apparatus can include the following processes.

At process C1, a current startup number and an apparatus identifier of the hardware apparatus are obtained from a broadcast signal of the hardware apparatus. "Startup number" of the hardware apparatus refers to the number of times that the hardware apparatus has been started.

In embodiments of the present disclosure, when an apparatus sends a broadcast signal, a current startup number and an apparatus identifier of the apparatus can be added to the broadcast signal. Correspondingly, in this process, the third-party apparatus can perform parsing on the broadcast signal of the hardware apparatus to extract the current startup number and the apparatus identifier of the hardware apparatus from the broadcast signal.

At process C2, the current startup number and the apparatus identifier of the hardware apparatus are saved.

In this process, the third-party apparatus can save the obtained current startup number and apparatus identifier in a preset blacklist to temporarily block the hardware apparatus.

In embodiments of the present disclosure, the hardware apparatus can be temporarily blocked by obtaining the current startup number and the apparatus identifier of the hardware apparatus from the broadcast signal and saving the current startup number and the apparatus identifier. Thus, the block efficiency can be improved.

Further, in embodiments of the present disclosure, after the temporary block operation is performed on the hardware apparatus, the following processes can be performed.

At process D, after performing the temporary block operation on the hardware apparatus, a new apparatus identifier and a new startup number are re-received.

In this process, an apparatus identifier and a startup number of the hardware apparatus communicatively connected in the second connection mode can be re-obtained to obtain the new apparatus identifier and the new startup number.

At process E, when the new apparatus identifier matches the saved apparatus identifier of the hardware apparatus, and the new startup number does not match the saved startup number of the hardware apparatus, the temporary block operation is removed for the hardware apparatus, and the second connection prompt message is displayed again.

In this process, if the new apparatus identifier matches the save apparatus identifier of the hardware apparatus, the newly determined hardware apparatus can be indicated to be an apparatus that is temporarily blocked. Further, whether the new start-up number matches the startup number of the hardware apparatus corresponding to the save apparatus identifier can be determined. If the new startup number does not match the saved startup number of the hardware apparatus, it can indicate that the hardware apparatus is restarted. After the user restarts the hardware apparatus, the requirement of the user on whether to connect the hardware apparatus in the first connection mode can be changed. Thus, the temporary block operation can be removed directly, and the second connection prompt message can be re-displayed.

When the new apparatus identifier matches the save apparatus identifier of the hardware apparatus, the new apparatus identifier can be the same as the apparatus identifier of the saved hardware apparatus. When the new startup number does not match the startup number of the saved hardware apparatus, the new startup number can be different from the saved startup number of the hardware apparatus. For example, assume that the saved startup number is 10, and the new startup number is 11, the new startup number can be then determined to not match the saved startup number of the hardware apparatus. The re-displayed second connection prompt information can have the same content as the first connection prompt information that is displayed previously.

In embodiments of the present disclosure, by re-receiving the new apparatus identifier and the new startup number, when the new apparatus identifier matches the saved apparatus identifier of the hardware apparatus, and the new startup number does not match the saved startup number the hardware apparatus, that is, after the hardware apparatus is restarted, by directly removing the temporary block operation for the hardware apparatus, the hardware apparatus can be temporarily blocked in a lifecycle from apparatus startup to apparatus power-off of the hardware apparatus. Meanwhile, the user does not need to remove the temporary blocking of the hardware apparatus. For example, the blocking can be removed without manually moving the hardware apparatus out of the blacklist. Thus, the user operation can be simplified to a certain degree. Further, after the temporary block operation for the hardware apparatus is removed, the second connection prompt information can be re-displayed, which ensures that the user is not disturbed by the displayed connection prompt information when the hardware apparatus is temporarily blocked, and facilitates the user to conveniently re-establish the connection with the hardware apparatus. Thus, the connection efficiency can be improved to a certain degree.

In some other embodiments, when the new apparatus identifier matches the save apparatus identifier of the hardware apparatus, and the new startup number matches the saved startup number of the hardware apparatus, the temporary blocking of the hardware apparatus can continue to be maintained. Therefore, the hardware apparatus can be temporarily blocked in one life cycle. The connection prompt can be prevented from repeatedly popping up to bring a poor user experience to the user.

In embodiments of the present disclosure, the above process of connecting to the hardware apparatus according to the pre-saved effective information of the hardware apparatus can be realized through the following sub-processes.

At sub-process 1, the hardware apparatus can be connected based on a preset authentication condition and the effective information. The preset authentication condition includes an apparatus identifier of the third-party apparatus obtained in the second connection mode when the hardware apparatus is communicatively connected to the third-party apparatus in the second connection mode.

In this process, the apparatus identifier can be used to uniquely represent the third-party apparatus. A specific content of the apparatus identifier can be selected according to actual needs, which is not limited in embodiments of the present disclosure. For example, a universal unique identifier (UUID) of a client terminal corresponding to the hardware apparatus installed in the third-party apparatus can be used as the apparatus identifier of the third-party apparatus. UUIDs of client terminals installed in different third-party apparatuses can be different. Further, when the hardware apparatus is communicatively connected to the third-party apparatus in the second connection mode, the apparatus identifier can be sent to the hardware apparatus directly based on a communication channel between the hardware apparatus and the third-party apparatus. The hardware apparatus can store the received apparatus identifier to perform authentication during a subsequent connection. For example, when the apparatus identifier carried in the connection request sent by the third-party apparatus matches the apparatus identifier obtained by the hardware apparatus, the hardware apparatus can confirm that the third-party party apparatus has connection permission. Further, when the third-party apparatus has the connection permission, the hardware apparatus can be further connected to the third-party apparatus based on the effective information.

In embodiments of the present disclosure, when the hardware apparatus is communicatively connected to the third-party apparatus in the second connection mode, the apparatus identifier of the third-party apparatus obtained in the second connection mode can be used as the preset authentication condition. Therefore, when the third-party apparatus is connected to the hardware apparatus in the first connection mode, the authentication may not need to be performed manually. The authentication can be realized directly based on the apparatus identifier. Thus, the user operation can be further simplified to further improve the connection efficiency.

In embodiments of the present disclosure, the effective information can include a connection identifier and a connection password for the hardware apparatus in the first connection mode. Correspondingly, in some embodiments, before the third-party apparatus is connected to the hardware apparatus according to the pre-saved effective information of the hardware apparatus, the method can include determining to connect the hardware apparatus based on the connection identifier. In this process, the connection identifier can be an identifier used to uniquely represent the hardware apparatus in the first connection mode. For example, the connection identifier can be an apparatus name of the hardware apparatus. Available apparatuses can be searched, and then an apparatus with a name matching the connection identifier can be automatically connected. The apparatus name can include a type text of a hardware type to which the hardware apparatus belongs. Type texts of different hardware types can be different. For example, a type text of a UAV can be "DGI," and a type text of a handheld gimbal can be "pocket." Correspondingly, when the available apparatuses are searched, a searched apparatus having a name including the type text of the hardware type to which the hardware apparatus belongs can be used as an available apparatus. For example, when the hardware apparatus is the UAV, a searched apparatus with a name including "DGI" can be used as an available apparatus. Thus, a number of available apparatuses can be reduced to further improve the efficiency of determining the hardware apparatus from the available apparatuses.

In embodiments of the present disclosure, the hardware apparatus can be directly determined by the connection identifier of the pre-stored effective information. Thus, the connection can be realized without waiting for the user to manually select the hardware apparatus that needs to be connected. Thus, time required for connection can be shortened to further improve the connection efficiency.

Further, connecting the hardware apparatus according to the pre-saved effective information of the hardware apparatus can include the following processes.

At sub-process 10, the connection request carrying the connection password and the apparatus identifier of the third-party apparatus is sent to the hardware apparatus to connect the third-party apparatus to the hardware apparatus.

In this process, the connection password and the apparatus identifier can be used to determine whether the third-party apparatus has the connection permission. For example, when the carried connection password matches the preset connection password of the hardware apparatus, and the carried apparatus identifier matches the apparatus identifier pre-saved in the hardware apparatus, the hardware apparatus can agree to establish the connection with the third-party apparatus. Thus, the third-party apparatus can be connected to the hardware apparatus.

In embodiments of the present disclosure, the connection request carrying the connection password and the apparatus identifier of the third-party apparatus can be directly sent to the hardware apparatus based on the connection password in the effective information. Thus, the connection to the hardware apparatus can be realized. Therefore, the connection can be realized without waiting for the user to manually input the connection password, which can further shorten the time required for the connection and improve the connection efficiency.

In embodiments of the present disclosure, connecting to the hardware apparatus according to the pre-saved effective information of the hardware apparatus can include the following sub-processes.

At sub-process 21, when the third-party apparatus enters a preset mode, apparatuses that are able to be connected (i.e., connectable apparatuses) are detected near the third-party apparatus. area connectable apparatus is an apparatuses that is capable of being connected to the third-party apparatus in the first connection mode.

The preset mode can correspond to a direct-connection high-speed download mode.

In this process, the preset mode can be a mode in which the hardware apparatus is determined from the surrounding apparatuses that can be connected, and then the hardware apparatus can be connected. In an actual application scenario, the hardware apparatus can often send the broadcast signal. By sending the broadcast signal, the third-party apparatus can sense the existence of the hardware apparatus. If the third-party apparatus is able to receive the broadcast signal of one apparatus, the apparatus can be indicated to be within a connectable range of the third-party apparatus and can be connected to the third-party apparatus in the first connection mode. Further, the connectable apparatus near the third-party apparatus can be an apparatus within the connectable range of the third-party apparatus. When the connectable apparatuses near the third-party apparatus are detected, surrounding broadcast signals can be received, and the apparatuses corresponding to the broadcast signals that can be received can be used as the connectable apparatuses. In embodiments of the present disclosure, for any detected apparatus, whether an apparatus name of the apparatus includes a preset type of text corresponding to the hardware apparatus can be detected. Then, the apparatus with the apparatus name including the preset type text corresponding to the hardware apparatus can be determined as the connectable apparatus. The preset type text corresponding to the hardware apparatus can be a type text of a hardware type to which the hardware apparatus belongs. For example, when the hardware apparatus is a UAV, the preset type text corresponding to the hardware apparatus can be a type text "DGI" representing the UAV. Thus, by using the apparatus with the apparatus name including the preset type text corresponding to the hardware apparatus as the connectable apparatus, the number of the connectable apparatuses can be reduced to further improve the efficiency of determining the hardware apparatus from the connectable apparatuses.

At sub-process 22, the hardware apparatus is determined from the connectable apparatuses according to a signal parameter of the broadcast signals sent by the connectable apparatuses.

In this process, the signal parameter can be a parameter capable of measuring a distance between the connectable apparatus and the third-party apparatus. For example, the signal parameter can be a signal strength, for example, a received signal strength indication (RSSI). When the connectable apparatus is further from the third-party apparatus, the signal strength of the broadcast signal received by the third-party apparatus can be weaker. When the connectable apparatus is closer to the third-party apparatus, the signal strength of the broadcast signal received by the third-party apparatus can be stronger. Therefore, the signal strength can be used as the signal parameter to determine the hardware apparatus from the connectable apparatuses. In embodiments of the present disclosure, the connectable apparatuses near the third-party apparatus can be detected, and the hardware apparatus can be determined from the connectable apparatuses periodically. Thus, the hardware apparatus can be determined in time.

At 203, the hardware apparatus is connected to according to pre-saved effective information of the hardware apparatus.

In this process, the effective information can include a connection password. In some embodiments, a connection request carrying the connection password and the apparatus identifier of the third-party apparatus can be sent to the hardware apparatus to connect the hardware apparatus.

In embodiments of the present disclosure, the hardware apparatus can be automatically determined according to the signal parameters of the broadcast signals sent by the connectable apparatuses by detecting the surrounding connectable apparatuses. The third-party apparatus can be connected to the hardware apparatus according to the pre-saved effective information of the hardware apparatus. Thus, the hardware apparatus can be selected from the surrounding connectable apparatuses without needing the user to manually select the hardware apparatus from the surrounding connectable apparatuses. Thus, the user operation can be further simplified, and the connection efficiency can be improved.

In embodiments of the present disclosure, determining the hardware apparatus from the connectable apparatuses according to the signal parameters of the broadcast signals sent by the connectable apparatuses can include the following processes.

At sub-process 221, a connectable apparatus with a highest signal strength is determined according to the signal strengths of the broadcast signals sent by each of the connectable apparatuses. The connectable apparatus with the highest signal strength is determined to be the hardware apparatus.

In this process, the third-party apparatus can be configured to detect the signal strengths of the received broadcast signals sent by the connectable apparatuses and then determine the connectable apparatus with the highest signal strength by comparing the magnitudes of the signal strengths. Since different connectable apparatuses have different distances from the third-party apparatus, correspondingly, the signal strengths of the broadcast signals received by the third-party apparatus can be often different. The higher the signal strength is, the closer the connectable apparatus to the third-party apparatus is. In the actual application scenario, the hardware apparatus of the user is often closest to the user. Therefore, the connectable apparatus with the highest signal strength can be directly determined as the hardware apparatus. For example, FIG. 5 is a schematic diagram showing detection consistent with an embodiment of the present disclosure. As shown in FIG. 5, four connectable apparatuses exist nearby. A connectable apparatus with an RSSI value of –30 has the highest signal strength. Thus, the connectable apparatus can be determined as the hardware apparatus that needs to be connected.

Further, to avoid performing unnecessary operations, in embodiments of the present disclosure, whether a connectable apparatus having a signal strength greater than a preset strength threshold exists can also be detected first. If the connectable apparatus having a signal strength not smaller than the preset strength threshold exists, the hardware apparatus can be determined from the connectable apparatuses. The preset strength threshold can be a lowest strength value that is set according to actual needs. If the signal strength of the connectable apparatus is less than the preset strength threshold, the connectable apparatus can be determined to be far away from the third-party apparatus and may possibly not be the hardware apparatus that the third-party apparatus needs to be connected to. In some embodiments, the signal strengths corresponding to the connectable apparatuses can be compared with the preset strength threshold first. If the signal strengths corresponding to the connectable apparatuses are all less than the preset strength threshold, the surrounding connectable apparatuses can be determined to not be the apparatus that the user intends to connect. If a connectable apparatus corresponding to a signal strength not less than the preset strength threshold exists, the hardware apparatus can be then determined from the connectable apparatuses. Thus, an unnecessary operation of determining the hardware apparatus from the connectable apparatuses can be avoided, and the connection to a hardware apparatus that the user does not need to connect can be avoided. Meanwhile, when determining the hardware apparatus from the connectable apparatuses is not performed, displaying the first connection prompt information to the user can be avoided to further avoid causing unnecessary disturbance for the user.

In embodiments of the present disclosure, the user does not need to manually select the hardware apparatus that needs to be connected from surrounding connectable apparatuses, and the connectable apparatus with the highest signal strength can be directly determined as the hardware apparatus. The accuracy of the determined hardware apparatus can be ensured while the user operation is simplified and the connection efficiency is improved to further reduce the probability of connecting a wrong apparatus.

FIG. 6 is a schematic flowchart of another apparatus connection method consistent with an embodiment of the present disclosure. The method can be applied to the hardware apparatus. As shown in FIG. 6, the method includes the following processes.

At 201, when the hardware apparatus is communicatively connected to the third-party apparatus in the first connection mode for the first time, the hardware apparatus is connected to the third-party apparatus according to the pre-saved authentication information of the third-party apparatus. The authentication information is obtained in the following manner. When the hardware apparatus is communicatively connected to the third-party apparatus in the second connection mode, the authentication information of the third-party apparatus is obtained in the second connection mode. Before the hardware apparatus is connected to the third-party apparatus according to the pre-saved authentication information of the third-party apparatus, the third-party apparatus enters a preset high-speed download mode according to a specific instruction.

For example, the user can press a physical button of the hardware apparatus to input the specific instruction. Thus, the hardware apparatus can enter the high-speed download mode.

The hardware apparatus and the third-party apparatus in embodiments of the present disclosure can be the hardware apparatus and the third-party apparatus above. When the hardware apparatus is communicatively connected to the third-party apparatus in the second connection mode, since the communicative connection is established between the hardware apparatus and the third-party apparatus, the hardware apparatus and the third-party apparatus can directly establish the communicative connection in the second connection mode. Thus, the authentication information can be obtained conveniently and pre-saved at the hardware apparatus for subsequent use. Correspondingly, when the hardware apparatus is communicatively connected to the third-party apparatus in the first connection mode for the first time, the pre-saved authentication information can be directly read internally. Based on the authentical information, the communicative connection in the first connection mode can be established. When the hardware apparatus is not communicatively connected to the third-party apparatus in the first connection mode for the first time, the third-party apparatus can also be directly connected to the hardware apparatus based on the pre-saved authentication information, which is not limited in embodiments of the present disclosure.

In summary, in the apparatus connection method of embodiments of the present disclosure, when the hardware apparatus is communicatively connected to the third-party apparatus in the second connection mode, the authentication information of the third-party apparatus can be obtained in the second connection mode. In some embodiments, the hardware apparatus can be communicatively connected to the third-party apparatus in the first connection mode for the first time. Since the authentication information of the third-party apparatus is pre-obtained and pre-saved, when the communicative connection is performed in the first connection mode, the hardware apparatus can directly perform the authentication operation for the third-party apparatus based on the authentication information pre-saved internally. Thus, the connection efficiency of the hardware apparatus can be further improved.

In embodiments of the present disclosure, the authentication information can include the apparatus identifier of the third-party apparatus. Correspondingly, connecting the third-party apparatus according to the pre-saved authentication information of the third-party apparatus can include the following sub-processes.

At 2011, the connection request sent by the third-party apparatus is received. The connection request carries the apparatus identifier and the connection password.

In this process, the connection request may be the above connection request sent by the third-party apparatus. By carrying the apparatus identifier and the connection password in the sent connection request, the hardware apparatus can be facilitated to determine whether the connection can be established with the third-party apparatus.

At 2012, if the apparatus identifier carried in the connection request matches the apparatus identifier in the authentication information, and the connection password matches the preset connection password, the hardware apparatus is connected to the third-party apparatus.

In this process, pre-saving the apparatus identifier can be equivalent to adding the apparatus identifier to a white list. The third-party apparatus indicated by the apparatus identifier in the white list can have the connection permission. Further, if the carried connection password matches the apparatus identifier in the authentication information saved in the hardware apparatus, the third-party apparatus can be determined to pass the authentication operation. Further, whether the carried connection password is the same as the preset connection password can be determined. If the connection password is the same as the preset connection password, the third-party apparatus can be determined to be the apparatus of the user of the hardware apparatus. Correspondingly, the hardware apparatus can agree to establish the connection with the third-party apparatus to be connected to the third-party apparatus.

In some embodiments, the user often needs to perform a connection confirmation operation on the hardware apparatus. For example, the user can need to press a certain button to perform the authentication. In embodiments of the present invention, based on the apparatus identifier in the pre-saved authentication information, the authentication can be conveniently realized without manually performing any operation. Thus, the user operation can be further simplified, and the connection efficiency can be improved.

In an application scenario, to ensure a download speed of downloading the collected content from the hardware apparatus, the hardware apparatus of the user may need to be determined from the surrounding connectable apparatuses. Based on the first connection mode, the hardware apparatus can be directly connected to the third-party apparatus. Thus, the third-party apparatus can perform downloading at a high speed. In an existing implementation, the surrounding connectable apparatuses may need to be displayed to the user first. Then, the user can select the hardware apparatus that needs to be connected from the surrounding connectable apparatuses. Thus, the connection efficiency can be low. Therefore, embodiments of the present disclosure further provide another apparatus connection method.

Figure 7:
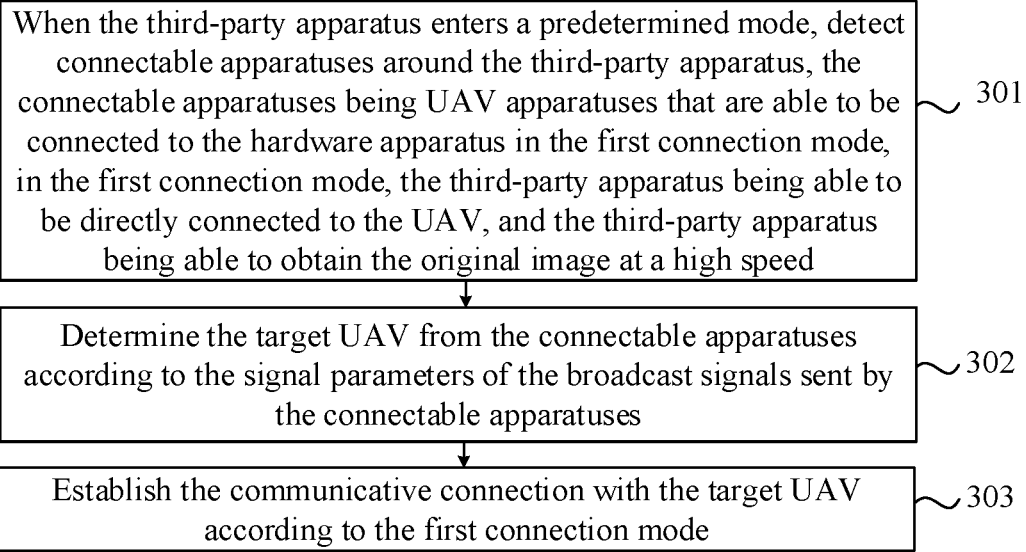
FIG. 7 is a schematic flowchart of another apparatus connection method consistent with an embodiment of the present disclosure.

In some embodiments, for example, the hardware apparatus can be a UAV, and the collected content can be an original image collected based on a camera carried on the UAV. FIG. 7 is a schematic flowchart of another apparatus connection method consistent with an embodiment of the present disclosure. The method can be applied to the communicative connection between a third-party apparatus and a target UAV. The unmanned aerial vehicle can carry a camera. The camera can be configured to collect an original image. As shown in FIG. 7, the method includes the following processes.

At 301, when the third-party apparatus enters a preset mode, connectable apparatuses near the third-party apparatus are detected. The connectable apparatuses are UAV apparatuses that are able to be connected to the hardware apparatus in the first connection mode. In the first connection mode, the third-party apparatus is able to be directly connected to the UAV, and the third-party apparatus is able to obtain the original image at a high speed.

The preset mode can refer to a high-speed download mode.

The third-party apparatus in embodiments of the present disclosure can be the above third-party apparatus. The preset mode can be set according to actual needs. If the third-party apparatus enters the preset mode, it can indicate that the third-party apparatus currently needs to determine the hardware apparatus of the user from the surrounding and establish a connection with the hardware apparatus based on the first connection mode. Further, when the connectable apparatuses near the third-party apparatus are detected, surrounding available apparatuses can be searched first. A searched apparatus with a name including type text of the hardware type to which the UAV belongs can be used as the connectable apparatus. For example, a searched apparatus with a name including "DGI" can be used as the connectable apparatus. Thus, the number of the connectable apparatuses can be reduced to further improve the efficiency of determining the target UAV from the connectable apparatuses.

Further, since the third-party apparatus is able to be directly connected to the UAV in the first connection mode, a transmission speed of a connection channel established based on the first connection mode can be often large. Correspondingly, after establishing the connection with the target UAV based on the first connection mode, the third-party apparatus can obtain the original image collected by the target UAV at a high speed. Obtaining at the high speed of embodiments of the present disclosure can refer to obtaining at a speed supported by the first connection mode.

At 302, the target UAV is determined from the connectable apparatuses according to the signal parameters of the broadcast signals sent by the connectable apparatuses.

In some embodiments, for an implementation of determining the target UAV from the connectable apparatuses according to the signal parameters of the broadcast signals sent by the connectable apparatuses, reference can be made to the implementation of determining the hardware apparatus from the connectable apparatuses according to the signal parameters of the broadcast signals sent by the connectable apparatuses, which is not repeated here.

For example, when the signal strengths of Bluetooth signals of the connectable apparatuses are determined, an apparatus with a Bluetooth signal of highest strength in the connectable apparatuses can be determined as the target UAV. The connectable apparatuses can be first communicatively connected to the target UAV based on the Bluetooth signal. A WIFI SSID and a password of the target UAV can be obtained through the Bluetooth signal. Then, based on the WIFI SSID and the password of the target UAV, a direct connection can be established with the target UAV based on a WIFI signal. With the direct connection based on the WIFI signal, the third-party apparatus can download the original image of the target UAV at a high speed.

At 303, the communicative connection with the target UAV is established according to the first connection mode.

In summary, in the apparatus connection method of embodiments of the present disclosure, by detecting the surrounding connectable apparatuses, the target UAV can be automatically determined according to the signal parameters of the broadcast signals sent by the connectable apparatuses. The communicative connection with the target UAV can be performed according to the first connection mode. Thus, since the user does not need to manually select the target UAV from the surrounding connectable apparatuses, the user operation can be simplified, and the connection efficiency can be improved.

In embodiments of the present disclosure, after the communicative connection with the target UAV is performed according to the first connection mode, the following processes can be performed.

At process F, the original image collected by the target UAV is downloaded through the communicative connection based on the first connection mode.

For example, the third-party apparatus can send an acquisition instruction to the target UAV. After receiving the acquisition instruction, the target UAV can send the collected original image to the third-party apparatus through the communicative connection established in the first connection mode.

In embodiments of the present disclosure, based on the communicative connection established in the first connection mode capable of directly connecting the third-party apparatus and the target UAV, the original image collected by the target UAV can be downloaded to obtain the original image at a high speed. Thus, image downloading speed can be ensured, and the downloading efficiency can be improved.

In embodiments of the present disclosure, the third-party apparatus can enter the preset mode in the following manner. When the communicative connection established between the third-party apparatus and the UAV in the second connection mode is converted from the first preset state to the second preset state, the third-party apparatus can enter the preset mode. When the switch instruction of the user is received, the third-party apparatus can enter the preset mode. In some other embodiments, when the connection instruction of directly entering the first connection mode is received, the third-party apparatus can enter the preset mode.

The first connection mode can include one or more of a Bluetooth connection and a Wi-Fi network connection. The second connection mode can include connecting third-party apparatus to the target UAV through a remote control apparatus. By using the connection of the remote control apparatus and the target UAV as the second connection mode, the target UAV can be conveniently controlled to perform various tasks. The remote control apparatus can be a remote controller paired with the target UAV. The remote control apparatus can be connected to the target UAV through the SDR. The target UAV can be controlled by the remote control apparatus. The first preset state can include that the remote control apparatus is normally connected to the target UAV, and the remote control apparatus is normally connected to the third-party apparatus. The second preset state can include that the remote control apparatus is disconnected from the target UAV, and the connection is unstable or abnormal. The second preset state can further include that the remote control apparatus is disconnected from the third-party apparatus, and the connection is unstable or abnormal.

In an actual application scenario, if the remote control apparatus is normally connected to the target UAV, the user can be indicated to be currently in the state of using the remote control apparatus to control the target UAV. Further, if the communicative connection of the second connection mode is converted from the first preset state to the second preset state, the third-party apparatus can be determined to enter the preset mode, and the connection can be established in another connection mode. Correspondingly, when the communicative connection in the second connection mode is converted from the first preset state to the second preset state, the user can be considered in the current application scenario to possibly establish the connection in the first connection mode. Thus, the third-party apparatus can enter the preset mode to connect the third-party apparatus to the target UAV in the first connection mode to facilitate the user for subsequent use.

Further, the switch instruction can be sent when the user needs to switch the second connection mode to the first connection mode. The connection instruction directly entering the first connection mode can be sent when the user needs to directly enter the first connection mode. Correspondingly, after the third-party apparatus receives the switch instruction, it can be determined that the user currently needs to connect to the target UAV in the first connection mode. Thus, the third-party apparatus can enter the preset mode. Further, after the third-party apparatus receives the switch instruction, it can be determined that the user currently needs to directly connect to the target UAV in the first connection mode. Thus, the third-party apparatus can directly enter the preset mode.

In embodiments of the present disclosure, the preset mode can be actively entered when the communicative connection in the second connection mode is converted from the first preset state to the second preset state. Thus, the preset mode can be conveniently entered without the need to wait for the user to operate. Thus, the efficiency of entering the preset mode can be improved. When the switch instruction or the connection instruction sent by the user is received, the preset mode can be entered. Thus, the flexibility of user control can be improved, and an unnecessary operation of entering the preset mode can be avoided to further save operation resources.

In embodiments of the present disclosure, before the communicative connection with the target UAV is performed according to the first connection mode, the following processes can be further performed.

At process G, third connection prompt information is displayed. The third connection prompt information is used to indicate whether the communicative connection with the target UAV is performed in the first connection mode.

At process H, if a third operation with respect to the third connection prompt information is received, the communicative connection with the target UAV is performed according to the first connection mode.

At process I, if a fourth operation with respect to the third connection prompt information is received, the temporary block operation is performed on the target UAV based on the current startup number and the apparatus identifier of the target UAV.

In some embodiments, for an implementation of processes G to I, reference can be made to the related description of processes A to C, which is not repeated here.

In embodiments of the present disclosure, the third connection prompt information can be displayed first before the connection with the target UAV is performed. The user can perform the third operation with respect to the third connection prompt information. That is, the user can ensure that only when connecting to the target UAV, the operation of the communicative connection with the target UAV can be performed in the first connection mode. The possibility of connecting to the wrong apparatus can be greatly reduced to improve the connection effect. Meanwhile, when the user does not currently need to connect to the target UAV, the user can perform the fourth operation on the third connection prompt information. That is, the temporary block operation can be performed on the target UAV. Thus, the operation efficiency of temporarily blocking the hardware apparatus can be improved.

In embodiments of the present disclosure, the broadcast signal of the target UAV can carry the apparatus identifier and the startup number. Correspondingly, performing the temporary block operation on the target UAV based on the current startup number and the apparatus identifier of the target UAV can include the following processes.

At process I1, from a broadcast signal of the target UAV, the current startup number and the apparatus identifier of the target UAV are obtained.

At process I2, the current startup number and the apparatus identifier of the target UAV are saved.

In some embodiments, for an implementation manner of processes I1 and I2, reference can be made to the related description of processes C1 and C2, which is not repeated here.

In embodiments of the present disclosure, by obtaining the current startup number and the apparatus identifier of the target UAV from the broadcast signal, the startup number and the apparatus identifier can be saved to temporarily block the target UAV to further improve the block efficiency.

Further, in embodiments of the present disclosure, after performing the temporary block operation on the target UAV, the following processes can be performed.

At process J, after performing the temporary block operation on the target UAV, a new apparatus identifier and a new startup number are re-received.

At process K, when the new apparatus identifier matches the apparatus identifier of the target UAV, and the new startup number does not match the saved startup number of the target UAV, the temporary block operation on the target UAV is removed, and the fourth connection prompt information is re-displayed.

In some embodiments, for the implementation of processes J and K, reference can be made to the related description of processes D and E, which is not repeated here.

In embodiments of the present disclosure, the new apparatus identifier and the new startup number can be re-received. When the new apparatus identifier matches the saved apparatus identifier of the target UAV, and the new startup number does not match the saved startup number of the target UAV, the temporary block operation on the target UAV is directly removed after the target UAV is restarted. That is, the target UAV can be temporarily blocked within a life cycle of the target UAV from the apparatus startup to the apparatus power-off. Meanwhile, the user does not need to manually remove the temporary blocking of the target UAV. For example, the blocking can be removed without manually moving the target UAV out of the blacklist to simplify the user operation. Further, after the temporary block operation on the target UAV is removed, the fourth connection prompt information can be re-displayed, which ensures that the user is not disturbed by the displayed connection prompt information when the target UAV is temporarily blocked. Meanwhile, the user can be facilitated to establish a connection to the target UAV again to further improve the connection efficiency.

In embodiments of the present disclosure, determining the target UAV from the connectable apparatuses according to the signal parameters of the broadcast signals sent by the connectable apparatuses can include the following processes.

At 3021, a connectable apparatus with a highest signal strength is determined according to the signal strengths of the broadcast signals sent by the connectable apparatuses. The connectable apparatus with the highest signal strength is determined as the target UAV.

In some embodiments, for an implementation of process 3021, reference can be made to the related description of process 221, which is not repeated here.

In embodiments of the present disclosure, the user does not need to manually select the target UAV that needs to be connected from the surrounding connectable apparatuses. The connectable apparatus with the highest signal strength can be determined as the target UAV, which simplifies the user operation and improves the connection efficiency. Meanwhile, the accuracy of the determined target UAV can be ensured to further reduce the probability of connecting to the wrong apparatus.

In embodiments of the present disclosure, before determining the target UAV from the connectable apparatuses according to the signal parameters of the broadcast signals sent by the connectable apparatuses, the following processes can be performed.

At process L, whether a connectable apparatus having a signal strength greater than a preset strength threshold exists is detected according to the signal parameters of the broadcast signals sent by the connectable apparatuses.

At process M, if the connectable apparatus having a signal strength greater than the preset strength threshold exists, determining the target UAV from the connectable apparatuses is performed.

In some embodiments, for a specific implementation of processes L and M, reference can be made to the above description, which is not repeated here.

In embodiments of the present disclosure, determining the target UAV from the connectable apparatuses can be performed only when the connectable apparatus having a signal strength greater than the preset strength threshold exists. Thus, the unnecessary operation of determining the target UAV from the connectable apparatuses can be avoided, and the connection with the target UAV that the user does not need to connect can be avoided. Meanwhile, when determining the target UAV from the connectable apparatuses is not performed, the third connection prompt information can be prevented from being displayed to the user to avoid unnecessary disturbance to the user.

In embodiments of the present disclosure, the following processes can be performed.

At process N, when the communicative connection established between the third-party apparatus and the target UAV in the second connection mode is in the first preset state, the authentication information is sent to the target UAV. The authentication information includes the apparatus identifier of the third-party apparatus.

When the communicative connection established by the third-party apparatus and the target UAV in the second connection mode is in the first preset state, the third-party apparatus and the target UAV can normally transmit information. Therefore, the authentication information can be directly sent to the target UAV. Thus, the connection may not need to be established for sending the authentication information. The authentication information can be sent using the established connection, which can lower the cost of sending the authentication information and improve transmission efficiency. Correspondingly, the target UAV can receive the authentication information for storage.

Further, when the authentication information is sent to the target UAV, the connection request carrying the apparatus identifier can be sent to the target UAV. Thus, the third-party apparatus can be communicatively connected to the target UAV in the first connection mode. In some embodiments, the target UAV can perform the authentication on the third-party apparatus based on the apparatus identifier carried in the connection request. For example, when the carried apparatus identifier matches the apparatus identifier included in the received authentication information, the target UAV can confirm that the third-party apparatus passes the authentication. Thus, the authentication operation can be performed automatically on the third-party apparatus without the manual operation of the user to further simplify the user operation and improve the connection efficiency. In embodiments of the present disclosure, when a communicative connection established between the third-party apparatus and the target UAV in the second connection mode is in the first preset state, the connection information of the target UAV in the second connection mode can be obtained. The connection information can include the connection password in the first connection mode. For example, the third-party apparatus can send a password acquisition request based on the communicative connection established based on the second connection mode. Correspondingly, the target UAV can return the connection password after receiving the password acquisition request. Correspondingly, when the connection request carrying the apparatus identifier is sent to the target UAV, the connection request carrying the apparatus identifier and the connection password can be sent to the target UAV. For example, when the carried connection password matches the preset connection password of the target UAV, and the carried apparatus identifier matches the apparatus identifier in the authentication information pre-saved in the target UAV, the target UAV can agree to establish the connection with the third-party apparatus. Thus, the third-party apparatus can be connected to the target UAV. In embodiments of the present disclosure, the connection password can be obtained through the communicative connection established in the second connection mode. When the connection request is sent subsequently, the password may not need to be additionally obtained, and the pre-obtained connection password can be carried by the connection request. That is the third-party apparatus can be quickly connected to the target UAV, which improves the connection efficiency. In embodiments of the present disclosure, the connection information can further include the connection identifier of the target UAV. After obtaining the connection information of the second connection mode of the target UAV, the following processes can also be performed.

At process O, the communicative connection established in the second connection mode is disconnected when the switch condition is satisfied.

Figure 8:
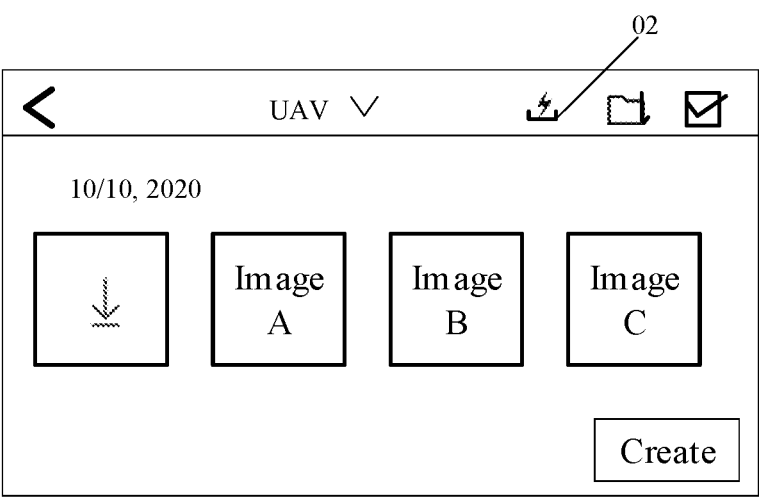
FIG. 8 is a schematic diagram of another interface consistent with an embodiment of the present disclosure.
Figure 9:
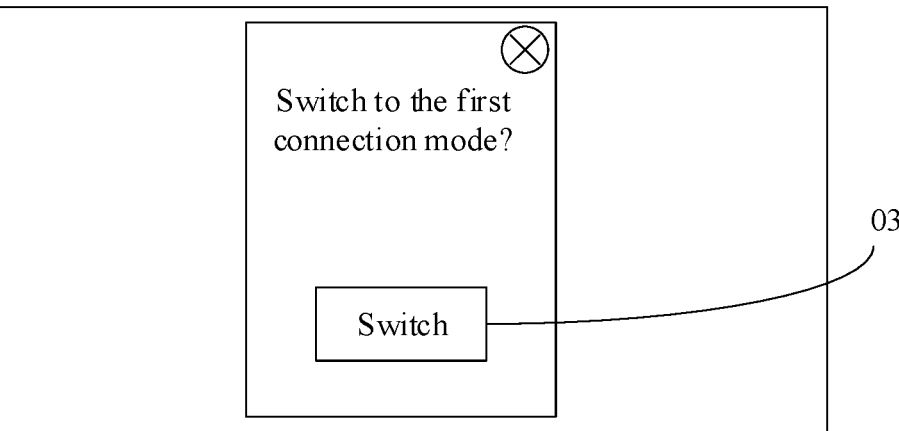
FIG. 9 is a schematic diagram of another interface consistent with another embodiment of the present disclosure.

In this process, the switch condition can be set according to actual needs. For example, the switch condition can include that the second preset state is entered in the second connection mode, or the switch instruction is received. Further, when the switch condition is satisfied, the current communicative connection established in the second connection mode can be disconnected to facilitate to switch to another connection mode. For example, FIG. 8 is a schematic diagram of another interface consistent with an embodiment of the present disclosure. As shown in FIG. 8, the user clicks a button 02 in an album interface. Correspondingly, the third-party apparatus displays a switch option 03 shown in FIG. 9 to the user after detecting that the user clicks the button 02. Further, the user clicks the switch option 03 shown in FIG. 9 if the user needs to switch. Correspondingly, the third-party apparatus can confirm that the switch condition is currently satisfied after detecting that the user clicks the switch option 03. Then, a subsequent switch operation can be performed. The text content displayed in FIG. 9 is merely a schematic illustration. In actual applications, specific content can be set according to actual needs. For example, the displayed text content can also be set as "GO FLY it will switch to HD transmission, and the connection will be cut off for a short time. Please wait patiently." Further, after the switch operation is performed subsequently, the user can return to the interface shown in FIG. 8 and continue to browse the album based on the interface shown in FIG. 8. Since the target UAV is connected to the third-party apparatus in the first connection mode after switching, in a process of browsing the photo album, the third-party apparatus can obtain images in the target UAV at a high speed and display the images in the photo album.

Figure 10:
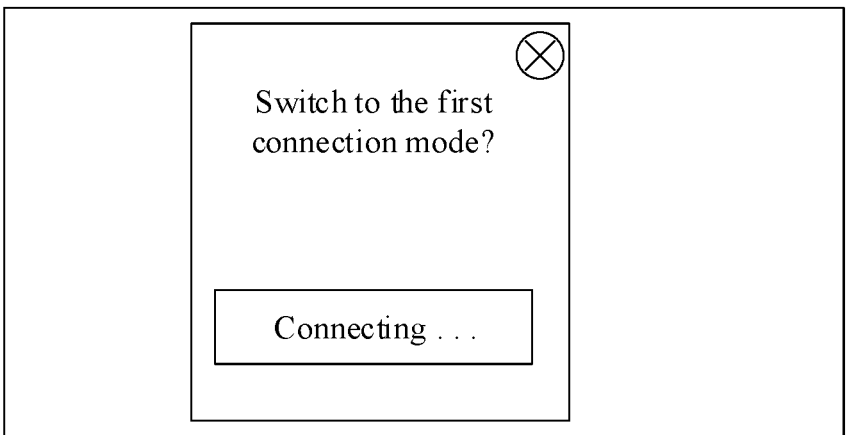
FIG. 10 is a schematic diagram of another interface consistent with another embodiment of the present disclosure.

Thus, the problem of browsing jamming caused by untimely loading can be avoided. After the user performs a click operation on the switch option, the third-party apparatus can further display information about the current connection state to the user. For example, FIG. 10 is a schematic diagram of another interface consistent with another embodiment of the present disclosure. As shown in FIG. 10, the interface displays a connection state "connecting." FIG. 11 is a schematic diagram of another interface consistent with another embodiment of the present disclosure. As shown in FIG. 11, the interface displays a connection state "connection successful."

At process P, the target UAV is determined based on the connection identifier, and the communicative connection with the target UAV is established in the first connection mode based on the connection password.

In this process, the surrounding available apparatuses can be searched, and then an apparatus with a name matching the connection identifier can be determined as the target UAV. Further, the connection request carrying the connection password can be sent to the target UAV to establish the communicative connection with the target UAV in the first connection mode. In embodiments of the present disclosure, by obtaining the connection identifier and the connection password in advance, surrounding connectable apparatuses that are re-scanned may not need to be displayed to the user when the connection mode is switched. The user can select the target UAV from the surrounding connectable apparatuses. The connection mode can be switched to the first connection mode according to the pre-obtained connection identifier and the connection password to further simplify the user operation and improve the switch efficiency.

FIG. 12 is a schematic block diagram of an apparatus connection device consistent with another embodiment of the present disclosure. The device can be applied to the third-party apparatus. The device includes a memory 401 and a processor 402. The memory 401 can be used to store program codes. The processor 402 can be configured to call the program codes. When the program codes are executed, the processor 402 can be configured to perform the following operations. When the third-party apparatus is communicatively connected to the hardware apparatus in the first connection mode for the first time, the third-party apparatus can be connected to the hardware apparatus according to pre-saved effective information of the hardware apparatus. The effective information can be obtained in the following manner. When the third-party apparatus is communicatively connected to the hardware apparatus in the second connection mode, the effective information of the hardware apparatus can be obtained in the second connection mode. The effective information can be associated with the first connection mode. In some embodiments, for specific operations performed by the processor 402, specific implementation processes of the operations, and the technical effects that can be achieved, reference can be made to the above descriptions, which are not repeated here.

FIG. 13 is a schematic block diagram of another apparatus connection device consistent with another embodiment of the present disclosure. The device can be applied to the hardware apparatus. The device includes a memory 501 and a processor 502. The memory 501 can be used to store program codes. The processor 502 can be configured to call the program codes. When the program codes are executed, the processor 502 can be configured to perform the following operations. When the hardware apparatus and the third-party apparatus are communicatively connected in the first connection mode for the first time, the hardware apparatus can be connected to the third-party apparatus according to the pre-saved authentication information of the third-party apparatus. The authentication information can be obtained in the following manner. When the hardware apparatus is communicatively connected to the third-party apparatus in the second connection mode, the authentication information of the third-party apparatus can be obtained in the second connection mode. In some embodiments, for the specific operations performed by the processor 502, the specific implementation processes of the operations, and the technical effects that can be achieved, reference can be made to the related descriptions above, which are not repeated here.

FIG. 14 is a schematic block diagram of another apparatus connection device consistent with another embodiment of the present disclosure. The device can be applied to the communicative connection between the third-party apparatus and the target UAV. The UAV can carry a camera. The camera can be configured to collect an original image. The device includes a memory 601 and a processor 602. The memory 601 can be used to store program codes. The processor 602 can be configured to call the program codes. When the program codes are executed, processor 602 can be configured to perform the following operations. When the third-party apparatus enters the preset mode, the connectable apparatuses can be detected near the third-party apparatus. The connectable apparatuses can be a UAV apparatus that can be connected to the hardware apparatus in the first connection mode. In the first connection mode, the third-party apparatus can be directly connected to the UAV. Thus, the third-party apparatus can obtain the original image at a high speed. The target UAV can be determined from the connectable apparatuses according to the signal parameters of the broadcast signals sent by the connectable apparatuses. According to the first connection mode, the communicative connection with the target UAV can be performed. In some embodiments, for the specific operations performed by the processor 602, the specific implementation processes of the operations, and the technical effects that can be achieved, reference can be made to the related descriptions above, which are not repeated here. Further, embodiments of the present disclosure further provide a hardware apparatus. The hardware apparatus can be configured to perform the processes applied to method embodiments of the hardware apparatus. In some embodiments, the hardware apparatus can be a UAV and/or an unmanned vehicle. Further, embodiments of the present disclosure further provide a computer-readable storage medium. The computer-readable storage medium can store a computer program. When the computer program is executed by the processor, the processes of the apparatus connection method can be performed, which can achieve the same technical effect, which is not repeated here to avoid repetition.

The device embodiments described above are merely illustrative. Members described as separate components may or may not be physically separated. Members displayed as units may or may not be physical units. That is, the members can be located in one place, or can also be distributed on a plurality of network units. Some or all of the modules can be selected according to actual needs to achieve the objectives of the solutions of embodiments of the present disclosure. Those of ordinary skill in the art can understand and implement the method without creative efforts. Various embodiments of the present disclosure can be implemented by hardware, by a software module running on one or more processors, or by a combination thereof. Those skilled in the art can use a microprocessor or a digital signal processor in practice to implement some or all of the functions of some or all of the members in a computation processing apparatus according to embodiments of the present disclosure.

In the present disclosure, some or all apparatuses or device programs (e.g., computer programs and computer program products) of the described methods can be realized. Thus, the program of the present disclosure can be saved on the computer-readable medium, or may have a form of one or more signals. Such a signal can be downloaded from an Internet website or provided by a carrier signal, or provided in any other form. For example, FIG. 15 is a schematic block diagram of a computation processing apparatus consistent with another embodiment of the present disclosure. FIG. 15 illustrates a computation processing apparatus that can implement the method of the present disclosure. The computation processing apparatus includes a processor 710 and a computer program product or computer-readable medium in the form of a memory 720. The memory 720 can include an electronic memory such as a flash memory, an electrically erasable programmable read-only memory (EEPROM), an EPROM, a hard disk, or a ROM. The memory 720 includes a storage space 730 for performing the program codes of any process of the method described above. For example, the storage space 730 for the program codes can include program codes for implementing various steps in the above method. These program codes can be read or written into the one or more computer program products from one or more computer program products. These computer program products can include a program codes carrier such as hard disks, compact disks (CD), memory card, or floppy disks. Such a computer program product can be typically a portable or fixed storage unit as described with reference to FIG. 16. The storage unit can have a storage segment, and a storage space arranged similarly to the memory 720 in the computation processing apparatus of FIG. 15. The program codes can be compressed in an appropriate form. In some embodiments, the storage unit can include computer-readable codes, that is, codes that can be read by a processor such as, for example, the processor 710. When the codes are executed by the computation processing apparatus, the computation processing apparatus can be caused to perform various steps in the method above.

Various embodiments in the present disclosure are described in a progressive manner. Each embodiment focuses on the differences from other embodiments. Same or similar parts between various embodiments can refer to each other. In the present specification, "one embodiment," "an embodiment," or "one or more embodiments" means that a particular feature, structure, or characteristic described in connection with embodiments of the present disclosure is included in at least one embodiment of the present disclosure. In addition, the word example "in one embodiment" herein does not necessarily refer to the same embodiment. In the specification, a large number of specific details are described. However, embodiments of the present disclosure can be realized without these specific details. In some examples, well-known methods, structures, and techniques are not described in detail so as not to obscure the understanding of the specification. In the claims, any reference symbols located between parentheses shall not be used to limit the claims. The word "comprising" does not exclude the presence of elements or steps not listed in the claims. The word "a" or "an" before the element does not exclude the presence of a plurality of such elements. The present disclosure can be implemented by hardware including several different elements and by an appropriately programmed computer. In the claims enumerating units of the several devices, several of these devices can be embodied by the same hardware. First, second, and third do not represent any order. These words can be interpreted as names. The above embodiments are only used to illustrate the technical solutions of the present disclosure rather than limit the technical solutions of the present disclosure. Although the present disclosure is described in detail with reference to the above embodiments, those of ordinary skill in the art should understand that modifications can still be made to the technical solutions described in the above embodiments, or some technical features can be equivalently replaced. However, these modifications and replacements do not cause the essence of the corresponding technical solutions to depart from the spirit and scope of the technical solutions of embodiments of the present disclosure.

What is claimed is:

1. An apparatus connection method comprising:

in response to a mobile apparatus entering a preset mode, detecting one or more connectable apparatuses near the mobile apparatus that are capable of connecting to the mobile apparatus in a first connection mode;

detecting whether a connectable apparatus having a signal strength not lower than a preset strength threshold exists according to a signal parameter of a broadcast signal sent by each of the one or more connectable apparatuses;

in response to the connectable apparatus having the signal strength not lower than the preset strength threshold existing, determining an unmanned aerial vehicle (UAV) from the one or more connectable apparatuses according to the signal parameter of the broadcast signal sent by each of the one or more connectable apparatuses; and communicatively connecting to the UAV according to the first connection mode.

2. The method according to claim 1, wherein communicatively connecting to the UAV according to the first connection mode includes:

displaying connection prompt information indicating whether to connect to the UAV in the first connection mode; and in response to receiving an operation with respect to the connection prompt information, performing an operation to communicatively connect the mobile apparatus to the UAV in the first connection mode.

3. The method according to claim 2, further comprising:

obtaining effective information of the UAV through a second connection mode when the mobile apparatus is communicatively connected to the UAV in the second connection mode, the effective information being related to the first connection mode, and the second connection mode being for controlling the UAV to perform an aerial photography task and receiving a compressed image sent by the UAV while performing the aerial photography task.

4. The method according to claim 3, wherein the effective information includes a connection password.

5. The method according to claim 4, wherein communicatively connecting to the UAV in the first connection mode includes:

sending a connection request carrying the connection password to the UAV to connect the mobile apparatus to the UAV in the first connection mode.

6. The method according to claim 1, wherein communicatively connecting to the UAV according to the first connection mode includes:

in response to receiving an operation with respect to connection prompt information, performing an operation to connect to the UAV according to pre-stored effective information of the UAV.

7. The method according to claim 6, wherein performing the operation to connect to the UAV according to the pre-stored effective information of the UAV includes:

connecting to the UAV based on a preset authentication condition and the effective information.

8. The method according to claim 7, wherein:

the authentication condition includes an apparatus identifier of the mobile apparatus obtained through a second connection mode when the UAV is communicatively connected to the mobile apparatus in the second connection mode, the second connection mode being for controlling the UAV to perform an aerial photography task and receiving a compressed image sent by the UAV while performing the aerial photography task.

9. The method according to claim 8, wherein the second connection mode includes:

the mobile apparatus being connected to the UAV through a remote control apparatus; or a software-defined radio (SDR) used to control the UAV to perform the aerial photography task.

10. The method according to claim 1, wherein the first connection mode includes one or more of a Bluetooth connection and a Wi-Fi network connection.

11. The method according to claim 1, wherein:

the first connection mode is different from a second connection mode for controlling the UAV to perform an aerial photography task and receiving a compressed image sent by the UAV while performing the aerial photography task; and a download speed of the first connection mode is greater than a download speed of the second connection mode.

* * * * *